May 21, 1935. W. M. SHEEHAN 2,002,356
VEHICLE
Filed July 16, 1932 5 Sheets-Sheet 1
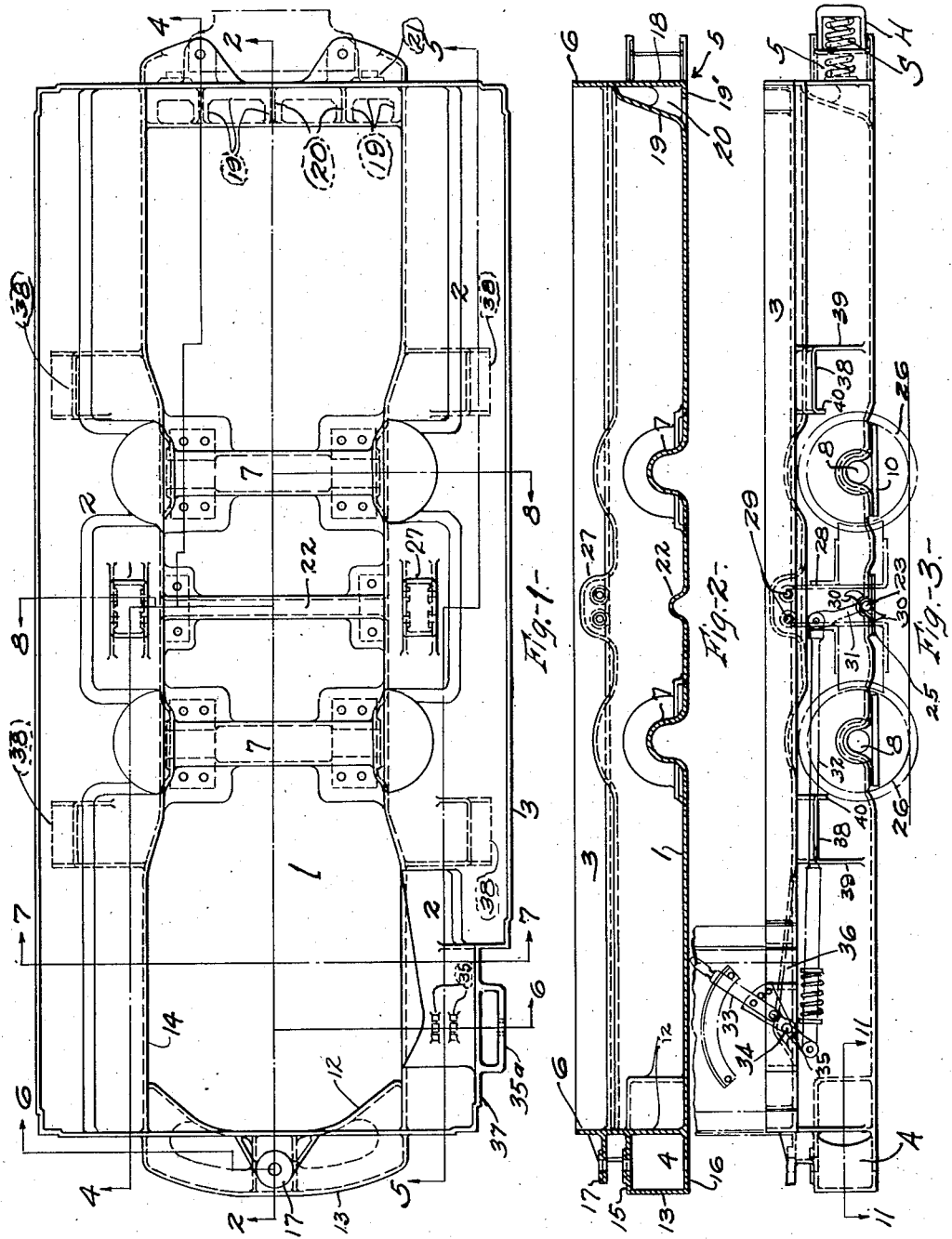
Inventor
William M. Sheehan
By
Rodney Bedell
Attorney

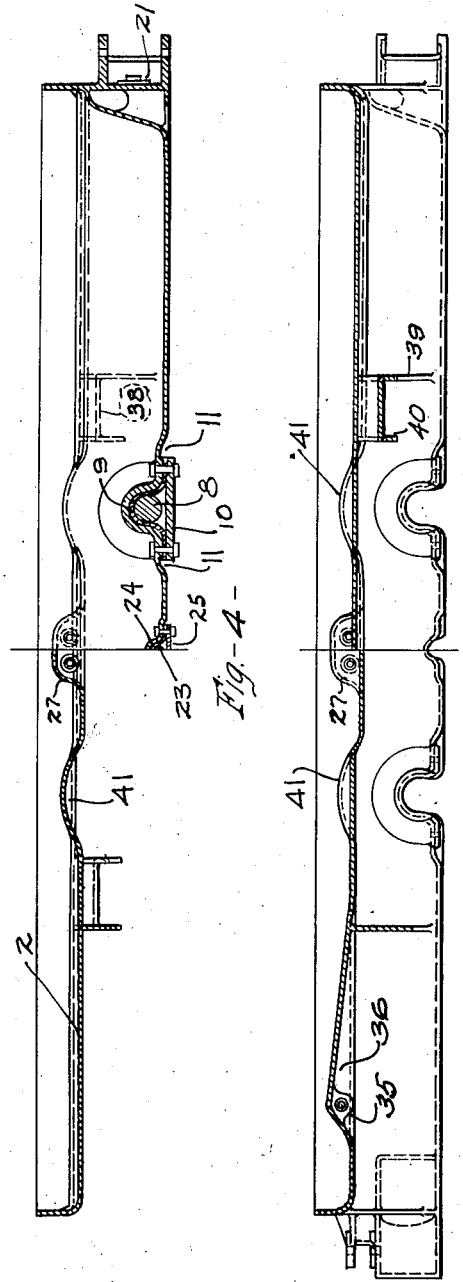

May 21, 1935.  W. M. SHEEHAN  2,002,356
VEHICLE
Filed July 16, 1932  5 Sheets-Sheet 3
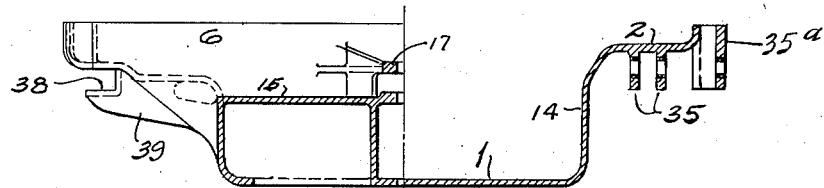
Fig.-6.-
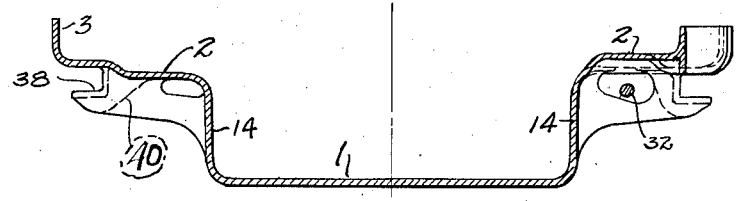
Fig.-7.-
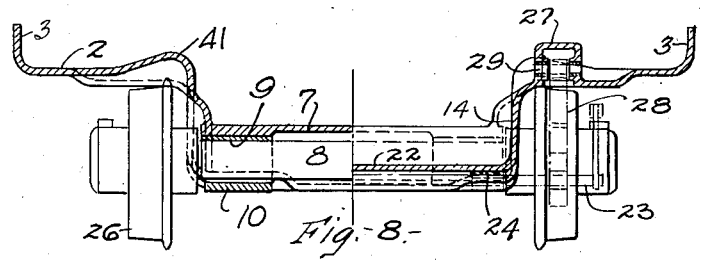
Fig.-8.-
Fig.-9.-  Fig.-10.-
Fig.-11.-
Inventor
William M. Sheehan
By
Rodney Bedell
Attorney

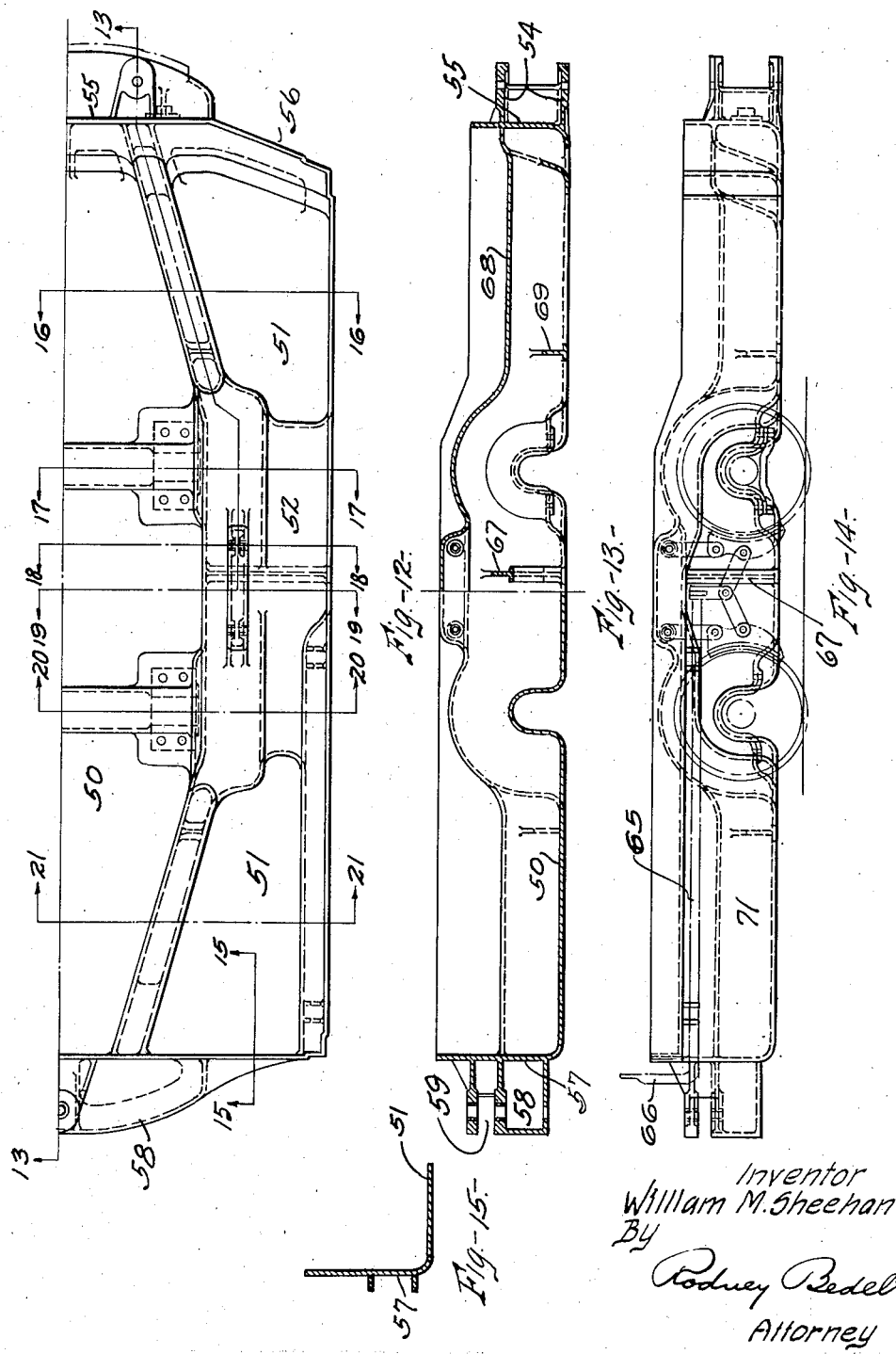

May 21, 1935.  W. M. SHEEHAN  2,002,356
VEHICLE
Filed July 16, 1932   5 Sheets-Sheet 5
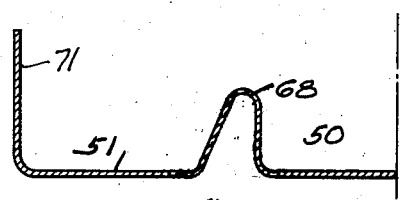
Fig.-16.-
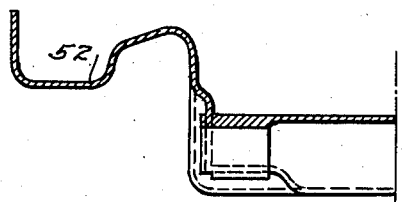
Fig.-17.-
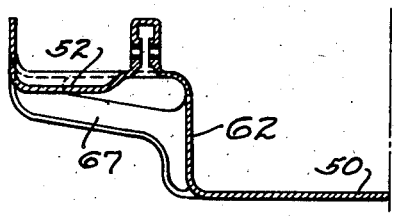
Fig.-18.-
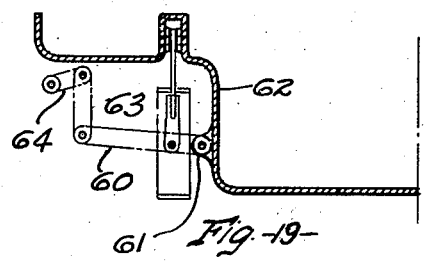
Fig.-19.-
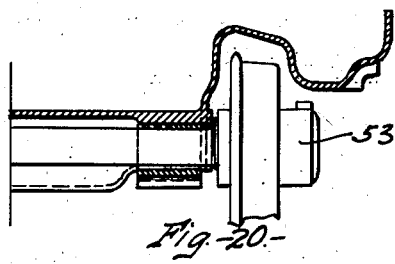
Fig.-20.-
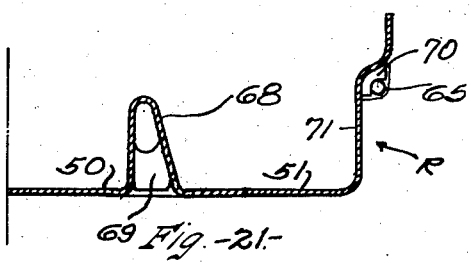
Fig.-21.-
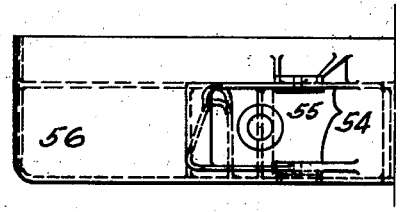
Fig.-22.-
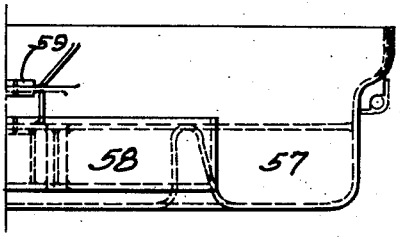
Fig.-23.-
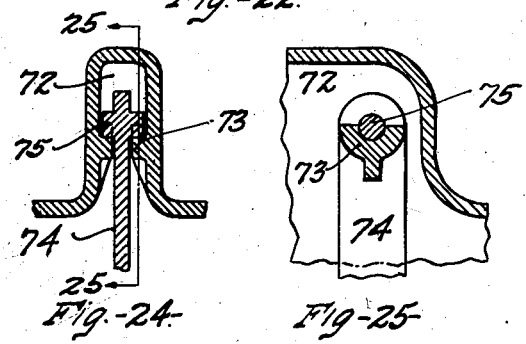
Fig.-24.-   Fig.-25-
Inventor
William M. Sheehan
By
Rodney Bedell
Attorney Patented May 21, 1935

2,002,356

UNITED STATES PATENT OFFICE 2,002,356

VEHICLE

William M. Sheehan, Merion, Pa., assignor to General Steel Castings Corporation, Granite City, Ill., a corporation of Delaware Application July 16, 1932, Serial No. 622,927

28 Claims. (Cl. 105—364)

The invention relates to vehicles used in mines, quarries, and in similar service where the vehicle is tilted or inverted to dump its load.

The main object of the invention is to increase the capacity of such a vehicle to the maximum extent possible with a given width, length and height of the vehicle.

A further object of the invention is to provide a rigid structure adapted to withstand the shocks, blows, and other heavy forces sustained from heavy chunks of material being dropped into the vehicle, from the buffing and draft forces applied to the vehicle, and from the stresses resulting from the dumping and other operations of the vehicle.

Another object of the invention is to provide a smooth interior for the vehicle to eliminate joints or crevices where dust, moisture, and other elements having a corrosive action can accumulate and act to weaken the structure or permit its contents to escape.

The above objects are common to the present application and to co-pending applications filed by the present applicant, Serial Nos. 594,687, and 616,673, and 619,226, filed February 23, 1932, June 11, 1932, and June 25, 1932, respectively. More particularly a substantial part of the present invention lies in the arrangement of the vehicle underframe and lower body structure to best accommodate brake rigging without reducing the capacity of the vehicle and without positioning the brake rigging where it is likely to project beyond the clearance limits established for the operation of the vehicle.

All of the above objects and other detailed objects, as will be referred to below, are attained by the structure illustrated in the accompanying drawings in which—

Figure 1 is a top view of a mine car underframe and lower body structure.

Figures 2, 4 and 5 are vertical longitudinal sections taken on the corresponding section lines of Figure 1.

Figure 3 is a side elevation of the structure shown in Figure 1.

Figures 6, 7, and 8 are vertical transverse sections taken on the corresponding section lines of Figure 1.

Figure 9 is an end elevation of one-half of the vehicle looking at the right-hand end of the same.

Figure 10 is a similar elevation looking at the left-hand end of the vehicle.

Figure 11 is a detail horizontal section taken on the line 11—11 of Figure 3.

Figure 12 is a top view of one longitudinal half of a modified underframe and lower body structure.

Figure 13 is a longitudinal vertical section taken approximately on the line 2—2 of Figure 12.

Figure 14 is a side elevation of the structure shown in Figures 12 and 13.

Figure 15 is a detail vertical longitudinal section taken on the line 15—15 of Figure 12.

Figures 16, 17, 18, 19, 20, and 21 are vertical transverse sections taken on the corresponding section lines of Figure 12.

Figure 22 is a half end view of the vehicle looking towards the right-hand end of the same.

Figure 23 is a similar end view looking towards the left-hand end of the vehicle.

Figure 24 is a detail transverse vertical section through a portion of a brake receiving housing illustrating a modification in the mounting arrangement.

Figure 25 is a vertical section on the line 25—25 of Figure 24.

In the structure illustrated in Figures 1 to 11, the car underframe and lower body structure comprises a single casting having a floor central section 1, elevated floor sections 2, vertical webs 14 connecting sections 1 and 2, sections 2 terminating in upstanding flanges 3 to which the upper portions of the car walls may be secured, end sills 4 and 5 including similar upstanding flanges 6 to which the upper portions of the car end walls may be secured.

Floor section 1 is provided with transverse corrugations 7 adapted to receive and house the car axles 8, and renewable axle bearing elements 9 are seated in the outer ends of corrugations 7. Axle retaining bars 10 are associated with bearing plates 9 and the ends of these elements are preferably secured together and to the car floor, as is best shown in Figure 4, the floor having an indentation 11 for accommodating the ends of these elements.

The left-hand end sill 4 includes an inner vertical wall 12 and an outer vertical wall 13. The upper portion of wall 12 extends in a straight line from side to side of the car but the lower portion of the wall is inclined rearwardly and outwardly and merges and terminates with vertical web 14 at a point spaced from the end of the car. Outer wall 13 extends inwardly from each side of the center line of the car and merges with the end of web 14. The upper and lower walls 15 and 16 of the end sill extend between vertical webs 14 only and with walls 12 and 13 form a box-shaped sill structure across the center portion of the car. A relatively short horizontal flange 17 projects outwardly from the upper portion of wall 12 and cooperates with upper wall 15 to form a jaw for receiving a draft element (not shown).

End sill 5 includes an outer wall 18, the upper part of which extends from side to side of the car, but the lower portion of which terminates with the vertical webs 14. An inner wall 19 is inclined inwardly and downwardly from wall 18 and terminates with webs 14. The lower portion of wall 18 is flanged inwardly, as indicated at 19', to form an end sill of triangular section. Vertical ribs 20 at intervals across the end sill serve to brace the two walls and preferably the outer wall 18 is provided with pads 21 forming seats for buffing springs S and housing H, these seats being backed up by ribs 20.

The floor and end sill structure described provides for the transmission of buffing and pulling forces from end to end of the car, and provides for the secure mounting of the vehicle axles in a manner which will tend to eliminate any racking or other distortion of the vehicle body by rough or uneven track, rail and switch joints, debris on the tracks, and similar injurious elements. The axle housings 7 provide protecting shrouds to prevent damage to axles or distortion or disalinement of the axle bearing elements from foreign matter on roadway or when car is off the roadway.

Intermediate axle housings 7, the central floor section 1 is provided with a relatively smaller corrugation 22 forming an upwardly extending recess for a brake operating shaft 23 extending transversely of the car and seated in bearing plates 24 secured to the car floor by retaining elements 25 similarly to the securing of axles 8. This recess protects the brake shaft and bearings in a similar manner to that previously described for the axle.

Intermediate car wheels 26 the elevated sections 2 of the car floor are provided with upstanding recesses 27 arranged to receive the upper ends of brake hangers 28, the same being pivotally supported by pins 29 seated in the sides of recesses 27. When the car is empty, pins 29 may be withdrawn easily and the hangers and brakes carried thereby may be removed for replacement or repairs. This advantage is particularly noticeable in connection with vehicles as illustrated in co-pending application 616,673 in which axle mounting elements depend from the floor at the side of the brake hanger recess thereby rendering access to the recess from below even more difficult than in the present structure.

The brakes are operated by cams 30 mounted on shaft 23, the latter being rotated by crank 31 which is actuated by connecting rod 32 extending longitudinally of the car in the recess between web 14 and floor section 2 to a point near the left-hand end of the car where an operating lever 33 is fulcrumed at 34 on a pin seated in brackets 35 projecting downwardly from the lower face of an upwardly extending recess 36 provided in the elevated floor section 2. The adjacent side wall flange 3 is offset inwardly at 37 to accommodate the brake operating lever 33 and parts associated therewith. A bracket 35a is provided in recess 37 to support the outer end of fulcrum pin.

At each side of the car and below floor side section 2 are provided a pair of brackets 38 which cooperate with the adjacent portion of the floor to receive and engage projecting elements on a car dumping machine (not shown) whereby the car may be retained when inverted and its load discharged. These brackets are integral with the rest of the car structure and include a web 39 on the side of the bracket spaced from the adjacent wheel and extending downwardly to the lower portion of web 14. A more shallow reinforcing rib 40 braces the inner end of the bracket from the inner portion of the elevated floor section 1. These ribs also brace the elevated floor portions 2.

Vertical webs 14 are spaced apart a greater distance at the end portion of the car than at the center of the car to provide greater capacity and at the same time to accommodate the running gear. The elevated floor sections 2 are conically indented, as indicated at 41, to accommodate the upper portions of the car wheels. This conical formation while giving increased capacity also reduces the tendency to create voids and permits freer discharge of the lading. In various other details the structure is shaped to provide maximum capacity in a manner which is not approached by structures used heretofore where the floor and other parts were not or could not be shaped to accommodate under-equipment, brake rigging, and clearance requirements as readily as the structure illustrated.

Figures 12 to 23 illustrate another form of this type of car embodying most of the features described above but characterized in having central floor section 50, widest at the center, and in having depressed side floor sections 51 at the ends of the car located at substantially the same level as the central section, the side portions 52 intermediate portions 51 being at a substantially higher level to clear the wheels and outside wheel hubs 53. Longitudinal corrugations 68 extend diagonally from each end sill to the wheel housing and are provided with transverse braces 69 at their lower portions. Another similar arrangement is shown in above-mentioned co-pending application Serial No. 616,673. This construction provides trussed combined draft and buffing columns consisting of diagonal elements 68 and side portions 52. The elements 68 are joined transversely at their extremities by end sills 76 and axle housings 77. This, while effectively transmitting the end sill forces longitudinally, at the same time increases the area of floor portions 51 and reduces the tendency of large pieces of load material to bridge and form voids.

The right-hand end sill is provided with draft mounting horizontal flanges 54 for a yielding buffer projecting a substantial distance beyond the main vertical wall 55 of the end sill, and this latter wall is inclined rearwardly, as at 56, at the sides of the car whereby clearance is provided between coupled cars when run over very sharp curves.

The left-hand end sill includes inner and outer walls 57 and 58, respectively, extending across the end of the car. Wall 58 provides an unyielding buffer face and a drawbar housing 59 projects outwardly from the central portion of the car end.

The toggle brake is operated by a lever 60 fulcrumed at 61 on the floor vertical web 62 and extending outwardly and arranged to be thrust downwardly by link 63 connected to the crank 64 of an operating shaft 65 which extends longitudinally of the car to a point beyond the end sill where its handle 66 may be operated. This shaft is journaled in bearings 70 formed integrally with the side walls 71. This arrangement eliminates the necessity of recessing the side of the car for the upright actuating handle and also eliminates the necessity of a recess in the floor web for the brake mechanism as provided in the structure previously described. However, the lower portion of the side wall is recessed, as indicated at R, (Figure 21), to accommodate shaft 65. A diagonal brace 67 (Figure 18) is located between the wheels and extends from the outer edge of the floor side section 52 inwardly and downwardly to the vertical web 62.

Figures 24 and 25 illustrate a modification of the brake hanger mounting structure which utilizes an upwardly extending recess 72 in the car floor, the opposing walls of the same being provided with integral cup-like elements 73 and the brake hanger 74 having lateral lugs or trunnions 75 seated in elements 73. This arrangement eliminates openings through the walls of the recess for pins, as previously described, and obviously the brake hanger may be assembled and disassembled readily and without the use of fulcrum pins.

The cars described above have been designed for use in coal mines and for such use the one-piece cast structure has been found highly desirable, and other characteristic features have been adopted to meet peculiar conditions in one or more mines. It will be understood that forms of floor and associated parts other than cast units may be used and that some features shown and described may be modified or eliminated without affecting the use of other features of the invention and obviously vehicles of the type described may be employed in various kinds of service other than in mines and the applicant contemplates the exclusive use of all new and useful features of the invention coming within the scope of the claims.

What is claimed is:

1. A vehicle floor forming web having a portion recessed upwardly to provide a housing for the upper part of a brake hanger and its supporting element, said housing including end walls adjacent to and extending alongside of said parts.

2. In a vehicle of the class described, a floor provided with a portion elevated to accommodate a wheel, a part of said portion being recessed upwardly to receive the upper portion of a brake hanger and a mounting element therefor.

3. In a vehicle of the class described, a floor forming web having a relatively narrow upwardly extending recess including spaced vertical walls, a brake hanger having its upper end positioned in said recess, and means on said walls for suspending said hanger.

4. In a vehicle of the class described, a floor, a side wall extending upwardly from said floor and having a restricted portion near one end only offset laterally of the vehicle, and a brake operating element positioned in said offset portion.

5. In a vehicle of the class described, spaced wheels and a floor portion lying between said wheels, an upward recess in said floor extending transversely thereof and a brake operating shaft located in said recess.

6. A vehicle car floor having an upward recess extending transversely of the vehicle and including integral bearing structure, said recess and structure being arranged to receive and journal a brake operating shaft.

7. In a vehicle of the class described, a floor comprising a central portion, side portions located at a higher level than said central portion, an upward recess in said central portion, a brake operating shaft received in said recess, an upward recess in at least one of said side portions, and a brake hanger suspended in said latter-mentioned recess.

8. In a vehicle of the class described, a floor having an upward recess for receiving a brake crank and a connecting rod actuated thereby, whereby the same may be within the normal contour of the floor structure so as to clear exterior objects near the vehicle.

9. In a vehicle of the class described, a side wall, a floor, a portion of said wall being offset inwardly to receive a brake operating handle, a portion of said floor being offset upwardly to receive a crank cooperating with said handle and an actuating rod leading from said crank longitudinally of the vehicle.

10. In a vehicle of the class described, a side wall, a floor, a portion of said wall being offset inwardly to receive a brake operating handle, a portion of said floor being offset upwardly and longitudinally of the vehicle to receive a crank cooperating with said handle and an actuating rod leading therefrom, other portions of said floor being offset upwardly and transversely of the vehicle to receive a brake operating shaft extending between brakes located on opposite sides of the vehicle.

11. A structure as described in claim 10 in which the floor and side wall, including the offset portions, are parts of an integral structure.

12. A railway vehicle floor forming web having a portion recessed upwardly to provide a housing for a brake hanger, there being a brake operating element fulcrum integral with the side of said portion and the latter being restricted in area to the extent required for said hanger and fulcrum.

13. In a vehicle of the class described, an axle and wheels, a floor with its major portion below the level of said axle but provided with an upward recess, there being an upward indentation in said floor at each side of said recess, a renewable axle bearing element seated in said recess with its ends turned outwardly and received in said indentations, and an axle retaining bar having its ends also received in said recess.

14. In a vehicle of the class described, a floor comprising a main center portion and a side portion located at a higher level than said center portion, and depending elements integral with said side portion and forming therewith a pocket for receiving the vehicle engaging member of a dumping device.

15. In a vehicle of the class described, a floor comprising a main center portion and a side portion located at a higher level than said center portion, an upright web connecting said portions, a downwardly and outwardly projecting bracket of restricted length forming a pocket for receiving a vehicle dumping device member, there being a vertical rib at the end of said bracket extending inwardly to said web.

16. In a vehicle of the class described, an axle and wheels, a floor having a relatively low central portion and side portions overlying said wheels, there being an upright web between said portions, a bracket projecting downwardly and outwardly from said side portion forming a pocket for receiving a vehicle dumping device member, there being a vertical rib at an end of said bracket, nearest the adjacent wheel, extending upwardly and rearwardly from the outer portion of said bracket to the side portion of said floor, and there being another rib at the other end of said bracket extending from the outer portion of said bracket inwardly to said web.

17. In a vehicle of the class described, a central floor portion, relatively elevated side floor portions, upright webs between said floor portions, an outwardly projecting elongated member of box section extending across the end of the vehicle, an outwardly projecting horizontal flange of restricted length above said member and forming therewith a drawbar pocket spaced inwardly from the outer face of said member, the end portions of the inner wall of said member being inclined rearwardly and merging with said webs.

18. In a vehicle of the class described, a central floor portion positioned in close proximity to the vehicle track, an end sill of triangular cross section having a lower horizontal element at substantially the same level as said floor portion, and flanges extending outwardly from the upper and lower portions of said sill and forming draft housing walls.

19. A structure as specified in claim 18 which also includes a buffer spring seat on said end sill and a vertical rib between the upright sides of said end sill and behind said seat.

20. In combination, a vehicle floor having an upwardly extending recess provided with spaced walls, there being upwardly facing concave seats on said walls opposed to each other, and a brake hanger positioned between said seats with lateral trunnions resting thereon.

21. A railway vehicle floor casting including a narrow upwardly extending downwardly open recess provided with spaced apart opposed upwardly facing bearings for supporting a brake hanger.

22. In a vehicle of the class described, a floor comprising a main center portion and a side portion located at a higher level than said center portion, an upright web connecting said portions, a downwardly and outwardly projecting bracket of restricted length forming a pocket for receiving a vehicle dumping device member, there being a vertical rib at the end of said bracket extending upwardly to said side portion.

23. In a vehicle of the class described, end sills, elements on said sills for mounting buffing and draft elements, a floor web between said end sills, wheel receiving housings in said web located a greater distance from the longitudinal center line of the vehicle than said elements, and corrugations in said web extending diagonally from said housings to said end sills at points on the latter adjacent said elements.

24. A structure as specified in claim 23 in which the floor web also includes transverse corrugations extending between said housings at points adjacent the inner ends of said diagonal corrugations.

25. In a vehicle of the class described, an end sill, a floor web having a longitudinally extending corrugation forming a wheel housing, there being a relatively narrow corrugation extending from the end of said housing diagonally inwardly of the vehicle to said end sill.

26. In a vehicle of the class described, a central floor portion, longitudinally disposed upright webs at the sides of said central floor portion, and an end sill of triangular cross section extending across the end of said floor portion and terminating at said webs, the outer wall of said end sill having an upward projection above the level of said sill extending laterally beyond the ends of said sill.

27. In a vehicle of the class described, a side wall, a portion of said wall being offset inwardly and a bracket in said offset integral with said wall and arranged to receive a brake operating handle.

28. In a vehicle of the class described, an axle and wheels, a floor having its major portion below the level of said axle but having an upwardly recessed portion including a projection forming a bearing seat in which said axle is journaled, there being an upward indentation in the floor at each side of said recessed portion for receiving an axle-retaining bar.

WILLIAM M. SHEEHAN.